US012638096B2

(12) United States Patent
Jiang

(10) Patent No.: US 12,638,096 B2
(45) Date of Patent: May 26, 2026

(54) POSITIVE AND NEGATIVE PRESSURE RESISTANT WATER SEAL PROTECTION DEVICE AND A TOILET DEVICE

(71) Applicant: Chengxu Jiang, Shenyang (CN)

(72) Inventor: Chengxu Jiang, Shenyang (CN)

( * ) Notice: Subject to any disclaimer, the term of this patent is extended or adjusted under 35 U.S.C. 154(b) by 147 days.

(21) Appl. No.: 18/784,075

(22) Filed: Jul. 25, 2024

(65) Prior Publication Data

US 2025/0305594 A1      Oct. 2, 2025

(51) Int. Cl.
*F16K 31/08*      (2006.01)
*E03D 11/00*      (2006.01)

(52) U.S. Cl.
CPC .............. *F16K 31/08* (2013.01); *E03D 11/00* (2013.01)

(58) Field of Classification Search
CPC . F16K 31/08; E03D 11/00; E03D 9/00; E03D 11/02; E03D 11/13
USPC .......................................................... 4/434
See application file for complete search history.

(56) References Cited

U.S. PATENT DOCUMENTS 6,370,709 B1 *      4/2002  Stradinger  ..............  E03F 1/006
                                                              4/434
2016/0289942 A1 *  10/2016  Hoang  ..................  E03D 11/135
2021/0353116 A1 *  11/2021  Dorra  ...................  A47K 13/302

FOREIGN PATENT DOCUMENTS

CN            115182419 A  * 10/2022  .............  E03D 11/10

* cited by examiner

*Primary Examiner* — Christine J Skubinna

(57)      ABSTRACT

This application belongs to the technical field of water seal protection for sewer pipes. More specifically, specifically relates to a positive and negative pressure resistant water seal protection device and a toilet device is disclosed. This application can actively provide closing force, has reliable sealing, and is equipped with a water seal protection device for both positive and negative pressure, as well as a toilet device using the same. The positive and negative pressure resistant water seal protection device comprising a main cavity and a rotating valve plate. The sealing part at one end of the rotating valve plate corresponds to the opening of the main cavity. The middle part of the rotating valve plate is connected to the main cavity through the rotating shaft.

9 Claims, 3 Drawing Sheets

POSITIVE AND NEGATIVE PRESSURE RESISTANT WATER SEAL PROTECTION DEVICE AND A TOILET DEVICE

FIELD OF THE INVENTION

The present application relates to sewer line water seal protection. More specifically, the present application relates to A positive and negative pressure resistant water seal protection device and a toilet device.

BACKGROUND

Sewer pipes are essential for removing sewage and wastewater from buildings, as well as supporting public facilities in cities. To prevent sewage and toxic gases from overflowing, anti-odor devices are typically installed in sewer pipes. These devices usually use a water seal structure to isolate the space and the sewer pipe, effectively preventing odors and harmful gases from escaping.

When the pressure in the sewer pipe changes due to drainage conditions, negative pressure can form and draw water from the water seal into the sewer pipe. This can damage the water seal, connecting the sewer pipe to the living space. As a result, harmful gases can enter the living space from the sewer pipe, potentially affecting indoor air quality and people's health.

Application number: 202210856940.5 pertains to a sealing device with a positive and negative pressure-resistant water seal protection function. This device is designed to prevent the negative pressure in the sewer line from compromising the water seal. In the context of a toilet system, the device addresses the challenge of the large diameter sewer pipe, where strong negative pressure may exceed the closing force of the valve plate, potentially leading to damage to the water seal.

SUMMARY

This application can actively provide closing force, has reliable sealing, and is equipped with a water seal protection device for both positive and negative pressure, as well as a toilet device using the same.

The positive and negative pressure resistant water seal protection device comprising a main cavity and a rotating valve plate. The sealing part at one end of the rotating valve plate corresponds to the opening of the main cavity. The middle part of the rotating valve plate is connected to the main cavity through the rotating shaft. The other end of the rotating valve plate is the functional part, wherein a functional cover is provided on the side of the main cavity. A negative pressure switch connected to the outer space of the main cavity is provided in the functional cover. An electromagnet controlled by a negative pressure switch is arranged outside the main cavity. An iron core corresponding to the electromagnet is arranged on the functional part of the rotating valve plate.

In an embodiment, the functional cover is provided with a fixed magnet corresponding to the functional portion of the rotating valve plate, and the functional portion of the rotating valve plate is provided with a moving magnet corresponding to the fixed magnet, wherein the fixed magnet and the moving magnet are arranged to repel each other.

In an embodiment, the functional cover is provided with a power source of an electromagnet. Wherein the power source is a battery, the positive electrode of the battery is connected to the positive terminal of the electromagnet and the negative pressure switch; the two negative terminals of the negative pressure switch are respectively connected to the negative terminals of the battery and the electromagnet.

In an embodiment, the electromagnet is provided with an external power line.

In an embodiment, the negative pressure switch comprises a case arranged in a functional cover, a contact element being arranged in the case, an opening of the case being arranged in the functional cover, a pressure-transmitting elastic membrane being arranged at the opening of the case, a negative pressure chamber being arranged between the pressure-transmitting elastic membrane and the contact element, the negative pressure chamber being connected to the external space of the main cavity through a pressure conducting hole on the case; an air cavity of the pressure-transmitting elastic membrane being arranged in the functional cover.

In an embodiment, two support rods are arranged outside the main cavity, and the rotating shafts on both sides of the middle of the rotating valve plate are respectively connected to the two support rods; wherein a mounting plate is arranged between the lower ends of the two support rods, and the electromagnet is arranged on the mounting plate.

A toilet device with positive and negative pressure resistant water seal protection device, comprising a toilet. Wherein the bottom of the toilet is provided with a connection frame, a support platform is provided in the connection frame, the edge of the main cavity of the positive and negative pressure resistant water seal protection device is provided with an overlap edge that cooperates with the support platform, and the bottom of the toilet is provided with a drainage port corresponding to the positive and negative pressure resistant water seal protection device; a sealing cavity is provided between the connection frame and the bottom of the toilet, and a sealing ring is provided in the sealing cavity.

In an embodiment, at the lower end of the connecting frame, a drainage branch pipe is arranged outside the positive and negative pressure water seal protection device. Wherein a pipe fitting is provided at the lower end of the connection frame, and the drainage branch pipe is connected to the pipe fitting.

Beneficial effects of this application: by using an electromagnet to provide an active closing sealing force for the rotating valve plate, this application prevents damage to the water seal caused by excessive negative pressure in the drainage pipe. This model is especially suitable for large drainage pipe diameters, such as those found in toilet systems.

BRIEF DESCRIPTION OF THE DRAWINGS

As shown in FIG. 1-3

Figure 1:
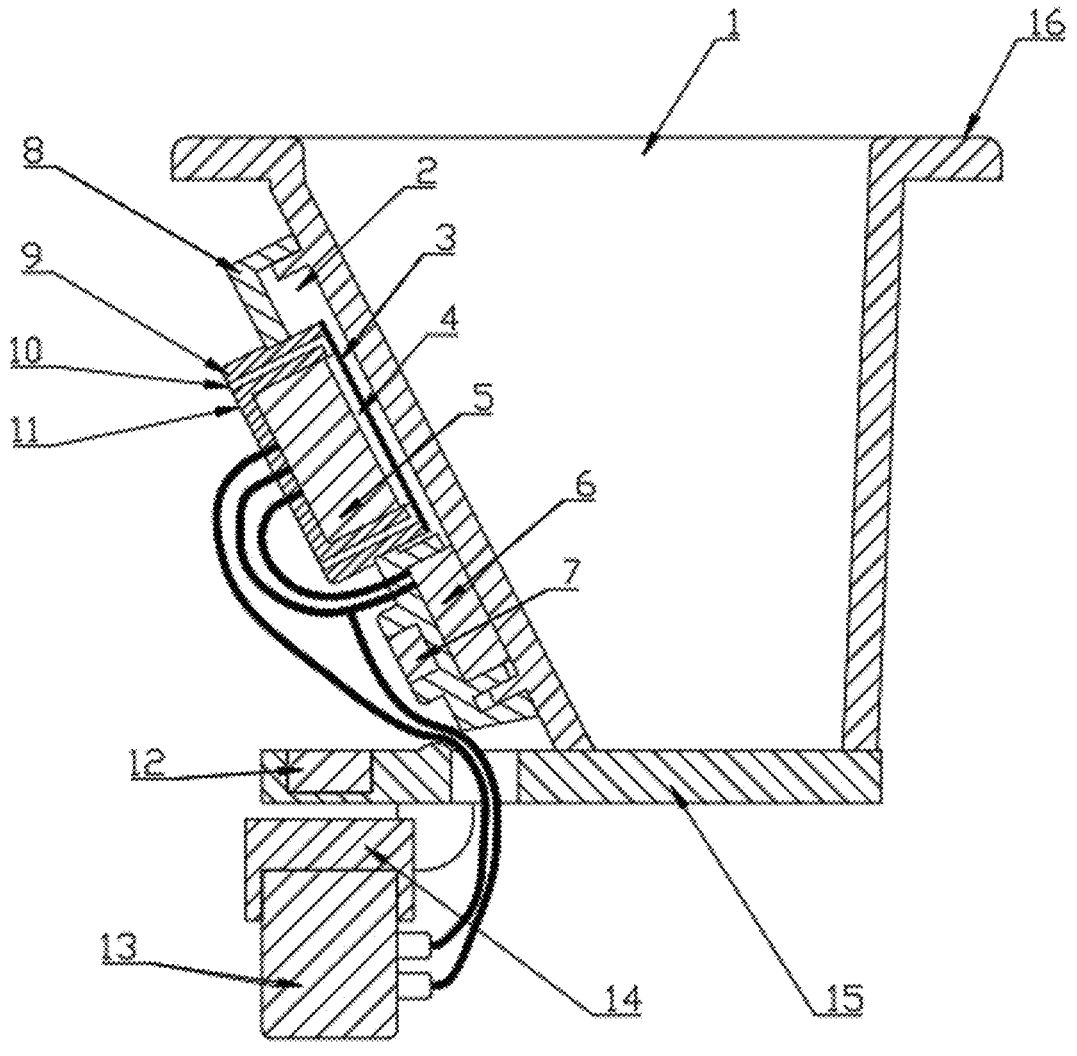
FIG. 1 is a perspective view of a positive and negative pressure resistant water seal protection device thereof.
Figure 2:
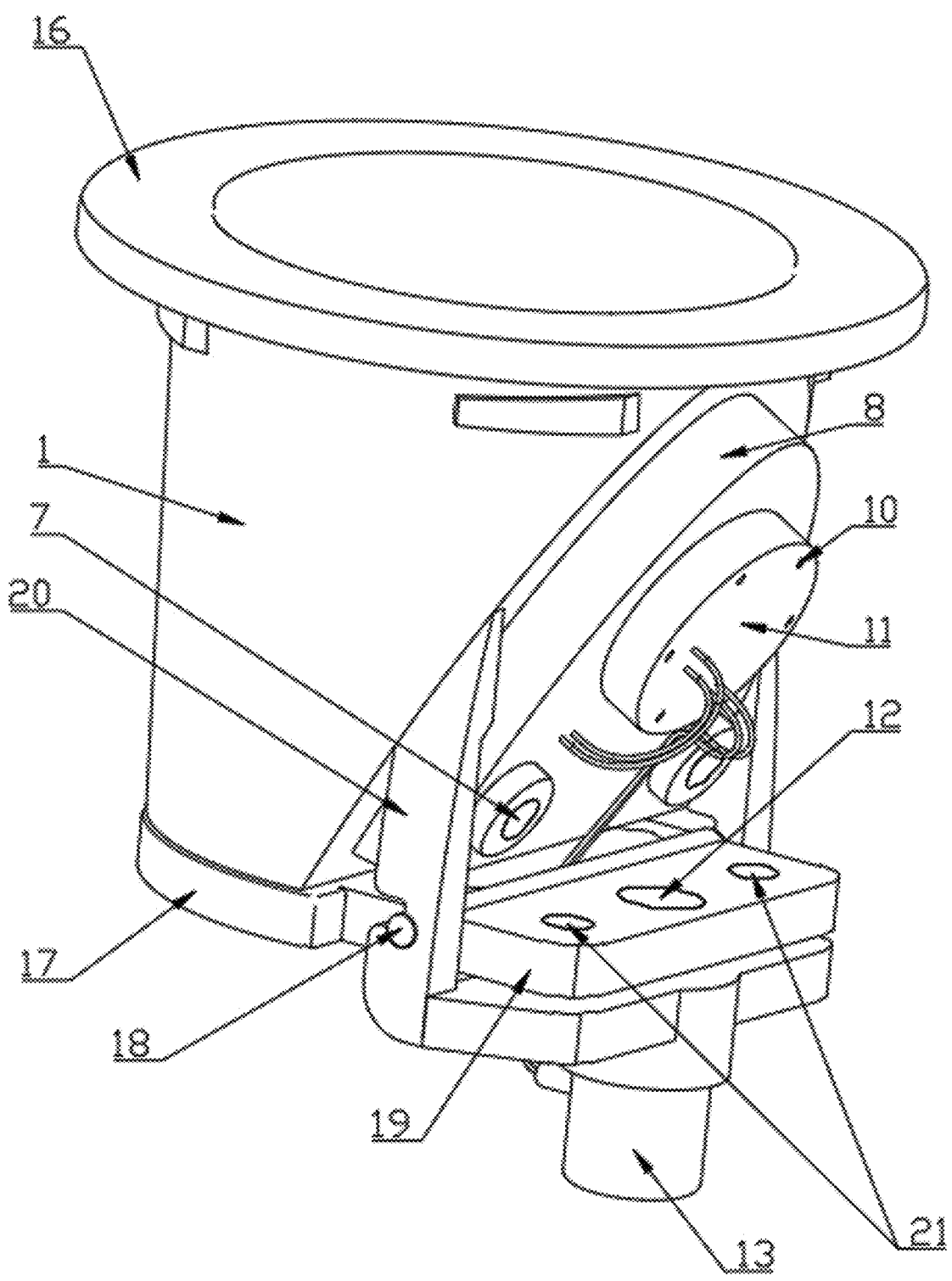
FIG. 2 is a sectional view of a positive and negative pressure resistant water seal protection device thereof.
Figure 3:
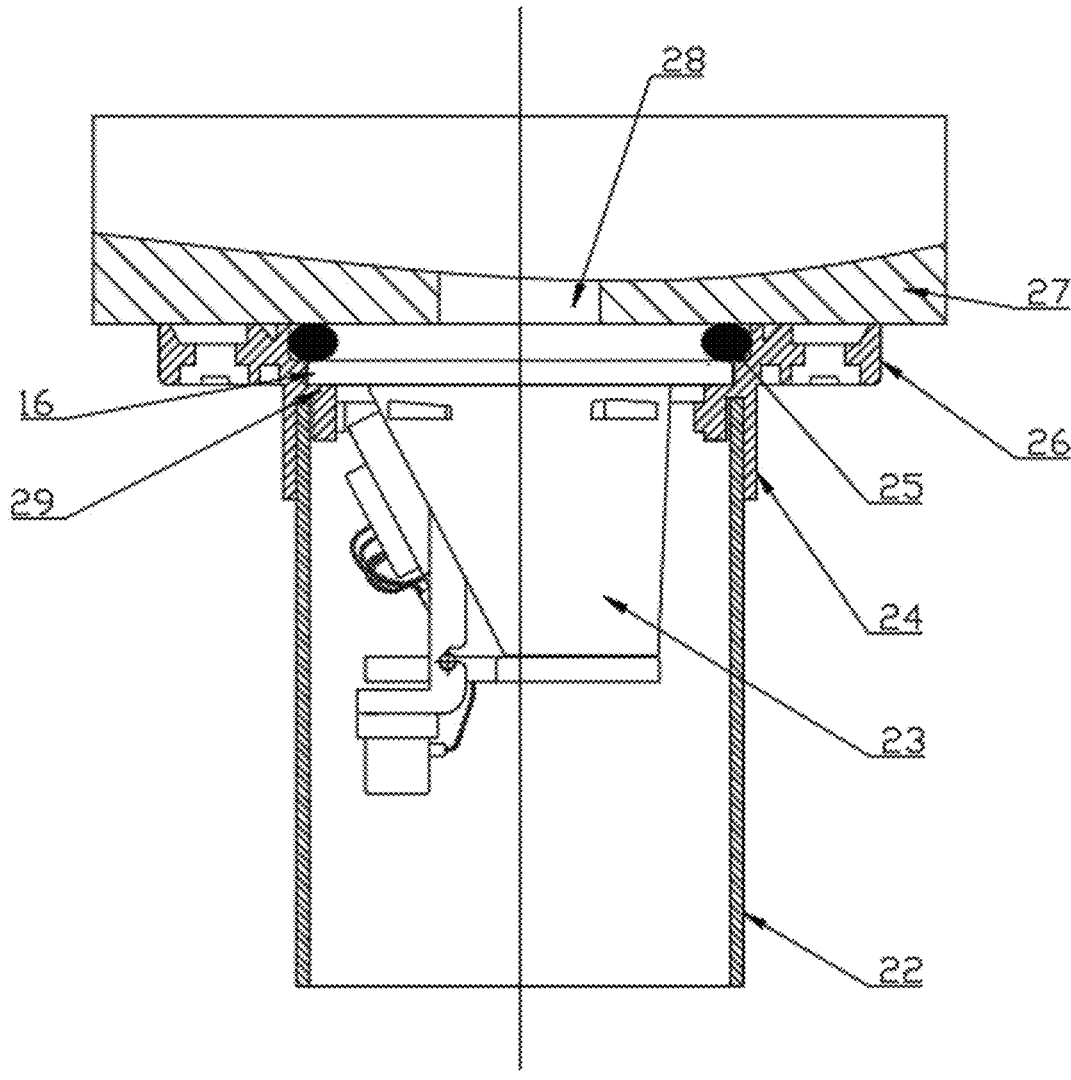
FIG. 3 is a perspective view of a toilet thereof.

1. main cavity
2. air cavity
3. pressure-transmitting elastic membrane
4. negative pressure chamber
5. contact element
6. battery
7. fixed magnet
8. functional cover
9. negative pressure switch 10. pressure conduction hole 11. case 12. iron core 13. electromagnet 14. mounting Plate 15. rotating valve plate 16. overlap edge 17. sealing part 18. rotating shaft 19. function portion 20. support rod 21. moving magnet 22. drainage branch pipe 23. positive and negative pressure resistant water seal protection device 24. pipe fitting 25. sealing ring 26. connection frame 27. toilet 28. drainage port 29. support platform While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

A positive and negative pressure resistant water seal protection device, comprising a main cavity and a rotating valve plate; wherein the sealing part 17 at one end of the rotating valve plate 15 corresponds to the opening of the main cavity 1, the middle portion of the rotating valve plate 15 is connected to the main cavity 1 via a rotating shaft 18, and the other end of the rotating valve plate 15 is a functional portion 19; wherein a functional cover 8 is arranged on the side of the main cavity 1; wherein a negative pressure switch 9 connected to the external space of the main cavity 1 is arranged in the functional cover 8; wherein an electromagnet controlled by the negative pressure switch 9 is arranged outside the main cavity 1, and an iron core 12 corresponding to the electromagnet is arranged on the functional portion 19 of the rotating valve plate 15.

In an embodiment, a positive and negative pressure resistant water seal protection device, comprising the functional cover 8 is provided with a fixed magnet corresponding to the functional portion 19 of the rotating valve plate 15, and the functional portion 19 of the rotating valve plate 15 is provided with a moving magnet 21 corresponding to the fixed magnet 7, wherein the fixed magnet 7 and the moving magnet 21 are arranged to repel each other.

In an embodiment, a positive and negative pressure resistant water seal protection device, comprising the functional cover 8 is provided with a power source of an electromagnet.

Wherein a positive and negative pressure resistant water seal protection device, comprising the power source is a battery 6, the positive electrode of the battery 6 is connected to the positive terminal of the electromagnet and the negative pressure switch 9; the two negative terminals of the negative pressure switch 9 are respectively connected to the negative terminals of the battery 6 and the electromagnet.

In an embodiment, a positive and negative pressure resistant water seal protection device, comprising the electromagnet is provided with an external power line.

In an embodiment, a positive and negative pressure resistant water seal protection device, comprising the negative pressure switch 9 comprises a case 11 arranged in a functional cover 8, a contact element 5 being arranged in the case 11, an opening of the case 11 being arranged in the functional cover 8, a pressure-transmitting elastic membrane 3 being arranged at the opening of the case 11, a negative pressure chamber 4 being arranged between the pressure-transmitting elastic membrane 3 and the contact element 5, the negative pressure chamber 4 being connected to the external space of the main cavity 1 through a pressure conducting hole 10 on the case 11; an air cavity 2 of the pressure-transmitting elastic membrane 3 being arranged in the functional cover 8.

In an embodiment, a positive and negative pressure resistant water seal protection device, comprising two support rods 20 are arranged outside the main cavity 1, and the rotating shafts 18 on both sides of the middle of the rotating valve plate 15 are respectively connected to the two support rods 20; wherein a mounting plate 14 is arranged between the lower ends of the two support rods 20, and the electromagnet is arranged on the mounting plate 14.

A toilet device with positive and negative pressure resistant water seal 23 protection device, comprising a toilet; wherein the bottom of the toilet 27 is provided with a connection frame 26, a support platform 29 is provided in the connection frame 26, the edge of the main cavity 1 of the positive and negative pressure resistant water seal protection device 23 is provided with an overlap edge 16 that cooperates with the support platform 29, and the bottom of the toilet is provided with a drainage port 28 corresponding to the positive and negative pressure resistant water seal protection device 23; a sealing cavity is provided between the connection frame 26 and the bottom of the toilet, and a sealing ring 25 is provided in the sealing cavity.

In an embodiment, the toilet device, comprising, at the lower end of the connecting frame 26, a drainage branch pipe 22 is arranged outside the positive and negative pressure water seal protection device 23.

The toilet device, comprising a pipe fitting 24 is provided at the lower end of the connection frame 26, and the drainage branch pipe 22 is connected to the pipe fitting 24.

The action process of the application

1. When the positive and negative pressure resistant water seal protection device 23 is in a pressure balance state, the fixed magnet 7 on the functional cover 8 and the moving magnet 21 on the rotating valve plate 15 interact to maintain the sealing state.

2. When draining water, the rotating valve plate 15 is opened under the action of water pressure, and the water is drained normally. The opening torque of the drainage water pressure is greater than the resistance torque of the interaction between the fixed magnet 7 on the functional cover 8 and the moving magnet 21 on the rotating valve plate 15.

3. When the drainage stops, the rotating valve plate 15 loses the effect of the opening torque and is closed under the resistance torque of the interaction between the fixed magnet 7 on the functional cover 8 and the moving magnet 21 on the rotating valve plate 15.

4. When negative pressure appears in the pipeline system, the negative pressure is transmitted to the negative pressure switch 9. The negative pressure switch 9 is provided with a pressure conduction hole 10, which transmits the negative pressure into the negative pressure chamber 4 of the negative pressure switch 9. The pressure transmitting elastic membrane 3 is deformed under the action of the pressure difference and contacts the sensing area of contact element 5 in the negative pressure switch 9. The contact element 5 can be a touch switch or a pressure sensor that can detect the contact pressure of the pressure transmission elastic membrane 3. At this time, the contact element 5 outputs a voltage signal, which is transmitted to the electromagnet to drive the electromagnet to attract the iron core 12 on the rotating valve plate 15. A resistance torque is given to the rotating valve plate 15 to prevent it from opening, and the resistance torque is much greater than the opening torque applied to the rotating valve plate 15 by the negative pressure of the pipeline system, ensuring that the rotating valve plate 15 does not open. The electrical signal of contact element 5 comes from battery 6 or the external power supply (the embodiment of the external power supply is not shown in the figure). After contact electronic element 5 senses the touch pressure, it outputs an electrical signal, so that battery 6, the opening module, and the electromagnet form a closed loop and work.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

The invention claimed is:

1. A positive and negative pressure resistant water seal protection device, comprising a main cavity and a rotating valve plate; wherein a sealing part at one end of the rotating valve plate corresponds to a opening of the main cavity, a middle portion of the rotating valve plate is connected to the main cavity via a rotating shaft, and an other end of the rotating valve plate is a functional portion; wherein a functional cover is arranged outside of the main cavity; wherein a negative pressure switch is arranged in a space in the functional cover, the space being outside of the main cavity; wherein an electromagnet controlled by the negative pressure switch is arranged outside of the main cavity, an iron core corresponding to the electromagnet is arranged on the functional portion of the rotating valve plate; two support rods are arranged outside of the main cavity, and rotating shafts at the middle of the rotating valve plate are respectively connected to the two support rods; and a mounting plate is arranged between lower ends of the two support rods, and the electromagnet is arranged on the mounting plate.

2. The positive and negative pressure resistant water seal protection device of claim 1, wherein the functional cover is provided with a fixed magnet corresponding to the functional portion of the rotating valve plate, and the functional portion of the rotating valve plate is provided with a moving magnet corresponding to the fixed magnet, wherein the fixed magnet and the moving magnet are arranged to repel each other.

3. The positive and negative pressure resistant water seal protection device of claim 1, wherein the functional cover is provided with a power source of the electromagnet.

4. The positive and negative pressure resistant water seal protection device of claim 3, wherein the power source is a battery, a positive electrode of the battery is connected to a positive terminal of the electromagnet and the negative pressure switch; two negative terminals of the negative pressure switch are respectively connected to negative terminals of the battery and the electromagnet.

5. The positive and negative pressure resistant water seal protection device of claim 1, wherein the electromagnet is provided with an external power line.

6. The positive and negative pressure resistant water seal protection device of claim 1, wherein the negative pressure switch comprises a case arranged in the functional cover, a contact element being arranged in the case, an opening of the case being arranged in the functional cover, a pressure-transmitting elastic membrane being arranged at the opening of the case, a negative pressure chamber being arranged between the pressure-transmitting elastic membrane and the contact element, the negative pressure chamber being in fluid communication with the main cavity through a pressure conducting hole on the case; an air cavity of the pressure-transmitting elastic membrane being arranged in the functional cover.

7. A toilet device with positive and negative pressure resistant water seal protection device dependent on any one of claims 1-6, comprising a toilet; wherein a bottom of the toilet is provided with a connection frame, a support platform is provided in the connection frame, an edge of the main cavity of the positive and negative pressure resistant water seal protection device is provided with an overlap edge that cooperates with the support platform, and the bottom of the toilet is provided with a drainage port corresponding to the positive and negative pressure resistant water seal protection device; a sealing cavity is provided between the connection frame and the bottom of the toilet, and a sealing ring is provided in the sealing cavity.

8. The toilet device of claim 7, wherein at a lower end of the connection frame, a drainage branch pipe is arranged outside of the positive and negative pressure water seal protection device.

9. The toilet device of claim 8, wherein a pipe fitting is provided at the lower end of the connection frame, and the drainage branch pipe is connected to the pipe fitting.

\* \* \* \* \*